(12) United States Patent
Syrjärinne

(10) Patent No.: US 6,618,006 B1
(45) Date of Patent: Sep. 9, 2003

(54) METHOD FOR DEFINING THE ERROR OF REFERENCE TIME AND AN ELECTRONIC DEVICE

(75) Inventor: Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/058,536

(22) Filed: Jan. 28, 2002

(30) Foreign Application Priority Data

Feb. 5, 2001 (FI) .............................................. 20010212

(51) Int. Cl.$^7$ .............................................. H04B 7/185
(52) U.S. Cl. .................................................. 342/357.12
(58) Field of Search ....................... 342/357.12, 357.06, 342/357.02, 352, 357.01; 701/213, 215

(56) References Cited

U.S. PATENT DOCUMENTS

| | | | |
|---|---|---|---|
| 4,636,795 A | 1/1987 | Dano | ........................ 342/387 |
| 6,084,544 A | 7/2000 | Camp, Jr. | .............. 342/357.15 |
| 6,191,731 B1 | 2/2001 | McBurney et al. | .... 342/357.05 |

FOREIGN PATENT DOCUMENTS

| | | |
|---|---|---|
| EP | 0166300 A2 | 1/1986 |
| GB | 2330717 | 4/1999 |
| WO | WO 99/53338 | 10/1999 |

*Primary Examiner*—Dao Phan
(74) *Attorney, Agent, or Firm*—Perman & Green, LLP

(57) ABSTRACT

A method for defining the reference time error of a receiver in a positioning means includes receiving a code-modulated signal transmitted by satellites, produced by an individual code for each satellite and modulated at least with binary modulation information. Positioning is conducted to define the reference time error, and an error value is calculated using the defined location. The minimum of the error value is searched by defining the receiver location using at least two different satellite locations corresponding to the signal time of transmission and by calculating an error value for said at least two locations of the receiver. The reference time error is defined using the searched minimum of the error value. In the receiver, the moment of bit change in the modulation information is defined, wherein said moment of bit change is used for specifying the error of the reference time.

14 Claims, 5 Drawing Sheets

METHOD FOR DEFINING THE ERROR OF REFERENCE TIME AND AN ELECTRONIC DEVICE

FIELD OF THE INVENTION

Figure 1:
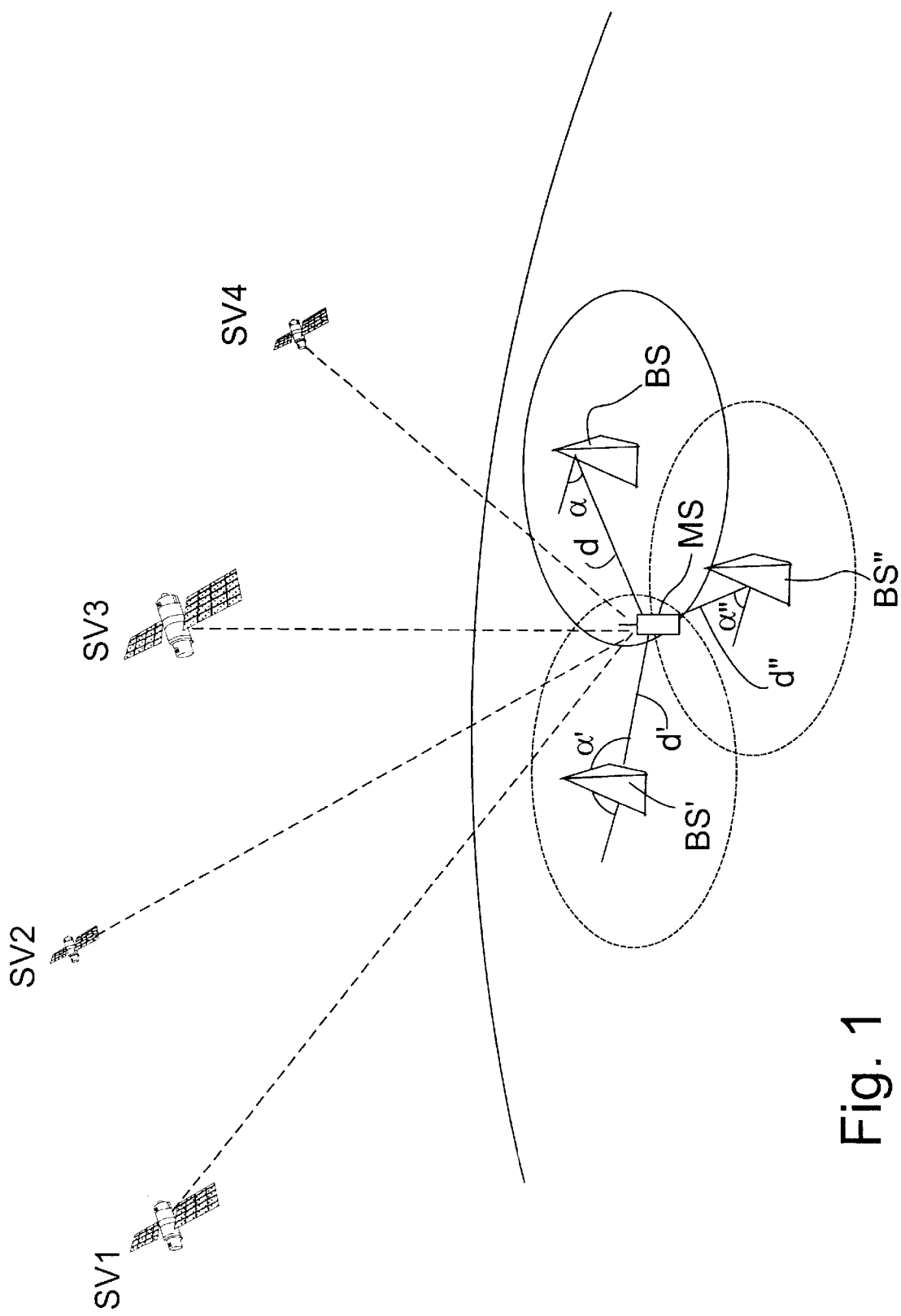

The present invention relates to a method for defining the reference time error of a receiver in a positioning means, to a positioning system having a receiver with means for forming a reference time, and to an electronic device having means for forming a reference time.

BACKGROUND OF THE INVENTION

One known positioning system is the GPS system (Global Positioning System) which presently comprises more than 20 satellites, of which a maximum of 12 are simultaneously within the sight of a receiver. These satellites transmit e.g. Ephemeris data of the satellite, as well as data on the time of the satellite. A receiver used in positioning normally deduces its position by calculating the propagation time of a signal transmitted simultaneously from several satellites belonging to the positioning system to the receiver. For the positioning, the receiver must typically receive the signal of at least four satellites within sight to compute the position.

Each satellite of the GPS system transmits a ranging signal at a carrier frequency of 1575.42 MHz called L1. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo random sequence. This pseudo random sequence is different for each satellite. As a result of the modulation, a code-modulated wideband signal is generated. The modulation technique used makes it possible in the receiver to distinguish between the signals transmitted from different satellites, although the carrier frequencies used in the transmission are substantially the same. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the iteration time (epoch) of the code is 1 ms. The carrier of the L1 signal is further modulated by navigation information at a bit rate of 50 bit/s. The navigation information comprises information about the "health", orbit, time data of the satellite, etc.

During their operation, the satellites monitor the condition of their equipment. The satellites may use for example so-called watch-dog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, the information received from different satellites can be weighted differently on the basis of the health data. Thus, it is possible to minimize the effect of errors on measurements, possibly caused by satellites which seem unreliable.

To detect the signals of the satellites and to identify the satellites, the receiver must perform acquisition, whereby the receiver searches for the signal of each satellite at the time and attempts to be synchronized and locked to this signal so that the data transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver. Also, in urban areas, buildings affect the signal to be received, and furthermore, so-called multipath propagation can occur, wherein the transmitted signal comes into the receiver along different paths, e.g. directly from the satellite (line-of-sight) and also reflected from buildings. This multipath propagation causes that the same signal is received as several signals with different phases.

The positioning arrangement has two primary functions:
1. to calculate the pseudo range between the receiver and the different GPS satellites, and
2. to determine the position of the receiver by utilizing the calculated pseudo ranges and the position data of the satellites. The position data of the satellites at each time can be calculated on the basis of the Ephemeris and time correction data received from the satellites.

The distances to the satellites are called pseudo ranges, because the time is not accurately known in the receiver. Thus, the determinations of position and time are repeated until a sufficient accuracy is achieved with respect to time and position. Because time is not known with absolute precision, the position and the time must be determined e.g. by linearizing a set of equations for each new iteration.

The pseudo range can be calculated by measuring the pseudo transmission time delays between signals of different satellites.

Almost all known GPS receivers utilize correlation methods for acquisition to the code as well as for tracking. In a positioning receiver, reference codes ref(k), i.e. the pseudo random sequences for different satellites are stored or generated locally. A received signal is subjected to conversion to an intermediate frequency (down conversion), after which the receiver multiplies the received signal with the stored pseudo random sequence. The signal obtained as a result of the multiplication is integrated or low-pass filtered, wherein the result is data about whether the received signal contained a signal transmitted by a satellite. The multiplication is iterated in the receiver so that each time, the phase of the pseudo random sequence stored in the receiver is shifted. The correct phase is inferred from the correlation result preferably so that when the correlation result is the greatest, the correct phase has been found. Thus, the receiver is correctly synchronized with the received signal. After the code acquisition has been completed, the next steps are frequency tuning and phase locking.

The above-mentioned acquisition and frequency control process must be performed for each signal of a satellite received in the receiver. Some receivers may have several receiving channels, wherein an attempt is made on each receiving channel to be synchronized with the signal of one satellite at a time and to find out the information transmitted by this satellite.

The positioning receiver receives information transmitted by satellites and performs positioning on the basis of the received information. For the positioning, the receiver must receive the signal transmitted by at least four different satellites to find out the x, y, z coordinates and the time data. The received navigation information is stored in a memory, wherein this stored information can be used to find out e.g. the Ephemeris data of satellites.

DETAILED DESCRIPTION OF THE INVENTION

Figure 2:
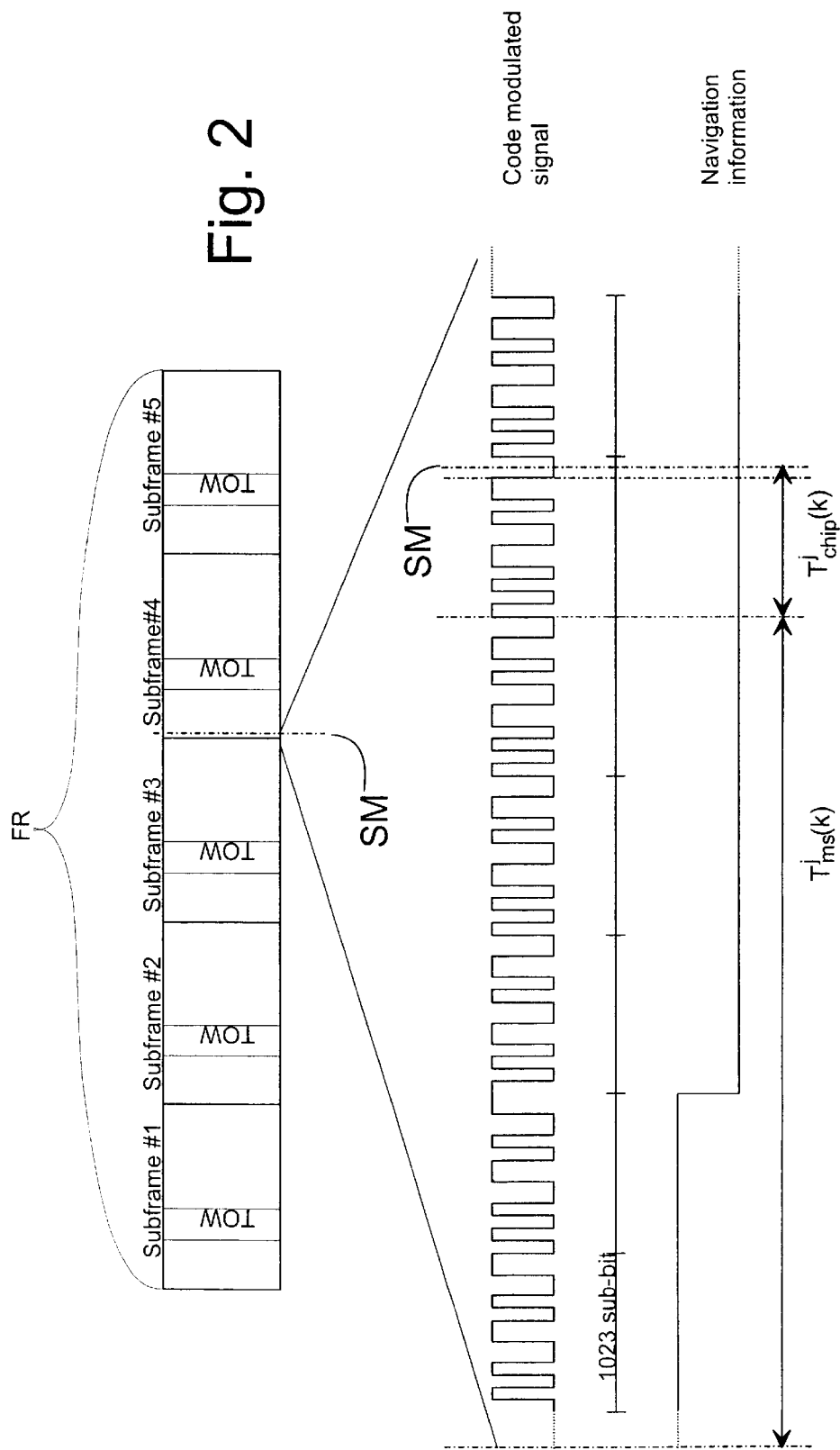

FIG. 1 shows, in a principle chart, positioning in a positioning receiver MS by means of a signal transmitted from four satellites SV1, SV2, SV3, SV4. In the GPS system, the satellites transmit Ephemeris data as well as time data, on the basis of which the positioning receiver can perform calculations to determine the position of the satellite at a time. These Ephemeris data and time data are transmitted in frames which are further divided into subframes. FIG. 2 shows an example of such a frame structure FR. In the GPS system, each frame comprises 1500 bits which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each sub-frame 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data of all the satellites. The entity of these subframes and frames is called a GPS navigation message which comprises 25 frames, i.e. 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe in question was transmitted. Thus, the time data indicates the time of transmission of a certain bit, i.e. in the GPS system, the time of transmission of the last bit in the subframe in question. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

In the precision of positioning it is of great importance how precisely the real GPS time is known by the receiver. In practice, precise GPS time can be defined after the positioning calculation, in which the clock error of the receiver with respect to the GPS time is determined. However, in the very first positioning calculation an estimation of the GPS time can be used, because the receiver does not necessarily know the real GPS time. The estimated GPS time at a moment of time k can be derived on the basis of measurement of three time elements according to the following formula:

$$T^j_{GPS}(k) = T_{TOW}(k) + T^j_{ms}(k) + T^j_{chip}(k) + 0{,}078 \quad (1)$$

in which $T_{TOW}{}^j$ = the time data (time of week) in seconds contained in the last received subframe, $T^j_{ms}(k) = $ the time corresponding to the number of C/A epochs received after the beginning of the last received subframe in seconds, $T^j_{chip}(k) = $ the time in seconds corresponding to the number (from 0 to 1022) and code phase of whole chips received after the last change of epoch, j = the receiving channel index.

In Formula 1, the average time of flight (ToF) of the signal from the satellite to the receiver is 78 ms. As a reference it is possible to use any such receiving channel in which the signal-to-noise ratio (SNR) is sufficient.

The time data (ToW) is transmitted in the navigation message at intervals of six seconds and it indicates the time passed from the last change of the GPS week. Thus, the value range of the time data is the remainder of one week. In a corresponding manner $$T^j_{ms}(k)$$

equals the remainder of six seconds and $$T^j_{chip}(k)$$

equals the remainder of 1 ms. The first three terms of the Formula (1) can also be used in the measurement of the time of arrival (ToA) of the signal.

In poor receiving conditions in which the navigation data cannot be indicated e.g. due to a high bit error rate (BER), it is not possible to determine the GPS time directly by means of the Formula 1. However, the code phase can normally still be measured.

The first three terms in the Formula 1 determine the time of transmission $$\hat{T}^k_{ToT}$$

of the received signal.

Figure 3:
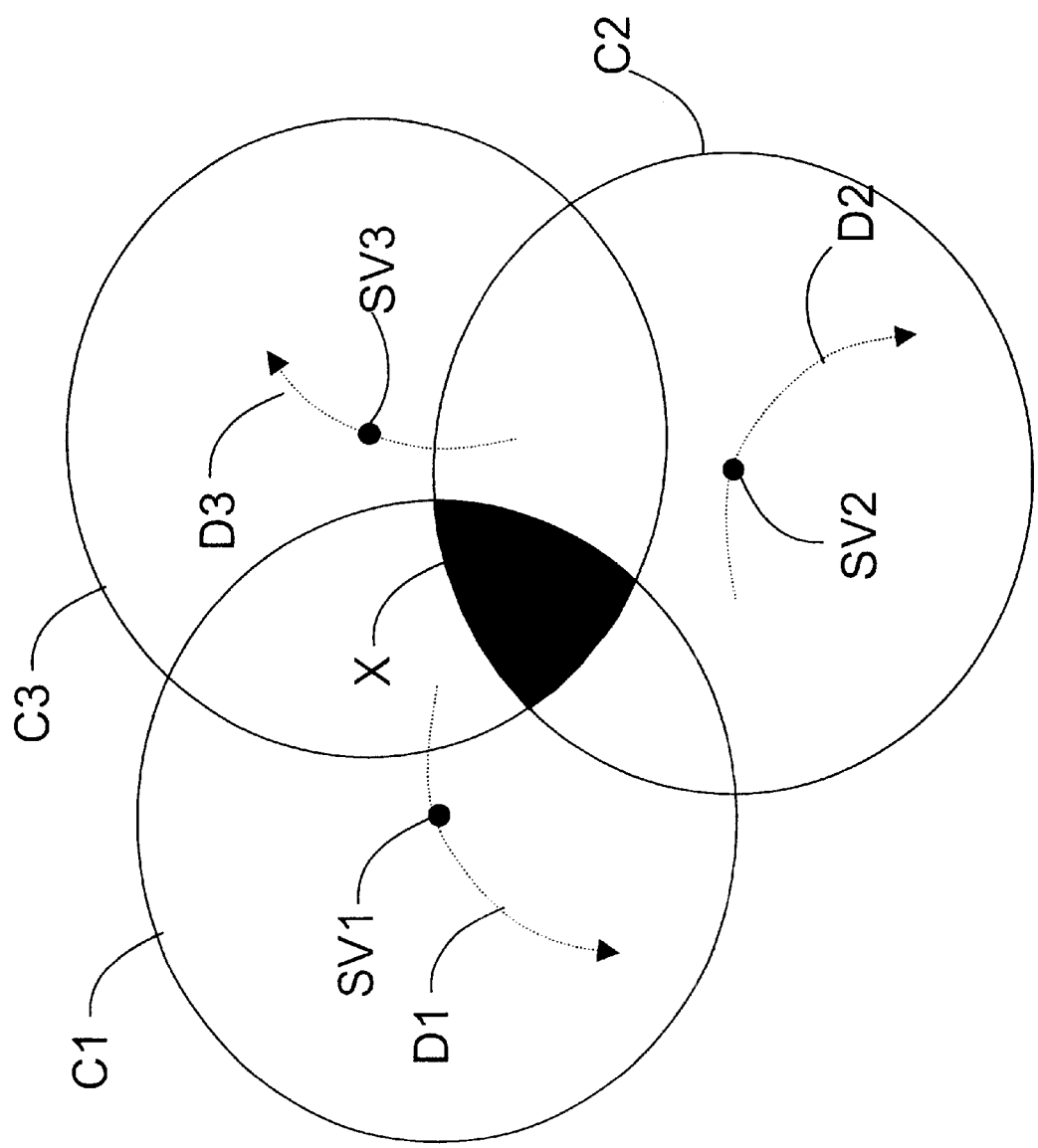

The appended FIG. 3 illustrates this formula and its different terms, used for estimating the time of transmission of a signal received at a moment of positioning. It is obvious that FIG. 3 is simplified with respect to the real situation, because e.g. one epoch comprises 1023 chips, wherein it is not reasonable to illustrate them in detail. The moment of positioning is illustrated by a dash-and-dot line indicated with the reference SM.

It is important to calculate the time of transmission of the received signal for each signal to be tracked, because the local reference time of the receiver, formed by the local oscillator of the receiver, is coupled to the GPS time on the basis of these values. Furthermore, the different propagation times of signals received from different satellites can be deduced from these measured values, because each satellite transmits the same chip substantially at the same time. Even though there may be minor differences in the timings of different satellites, they are monitored, and the error data is transmitted in the GPS navigation message, as was already mentioned above.

Under good receiving conditions and upon using an advantageous satellite constellation, the user's position and time error can be solved very accurately. A good satellite constellation means that the satellites to be used for positioning are selected so that seen from the receiver, they are clearly located in different directions, or the space angles at which the signals transmitted from different satellites arrive at the receiver are clearly different from each other.

However, in a situation where the received signal is weak, the information contained in the received navigation message cannot necessarily be utilized. Thus, the only useful measurements of the baseband signal relate to the number of chips and the code phase. If the receiver does not contain appropriate Ephemeris data and reference clock is not available therein, it is not, however, possible to calculate the position solely on the basis of the number of the chips and the code phase. Furthermore, the old Ephemeris data does not indicate the location of the satellites sufficiently accurately, wherein the precision of positioning is impaired. In the worst case the receiver does not contain any navigation data, which means that the times of transmission of the signals cannot be calculated, and the positioning is unsuccessful. In a corresponding manner, the lack of a reference clock makes it impossible to estimate the GPS time by means of methods of prior art, even though Ephemeris data was available. This means that in order to conduct positioning, the Ephemeris data must be defined from a different source than from the received signal transmitted by the satellites, if the aim is to perform positioning.

In practical applications the accuracy of the real-time clock RTC of the receiver can vary. In a corresponding manner, the time data transmitted from a base station BS of the mobile communication network and received by a receiver BS can be significantly, even several minutes delayed. However, this delay is not known by the receiver, and in addition, the delay can vary in different times of transmission of the time data. Furthermore, if the receiver is not capable of decoding the information transmitted in the navigation message, the receiver cannot obtain information of the GPS time. Inaccurate estimation of GPS time can cause significant errors in the positioning. Inaccurate estimation of GPS time results in that the calculated location of the satellites in inaccurate, which can cause an error of several milliseconds in pseudo ranges, wherein the calculated location of the receiver is also inaccurate. Furthermore, the rates of the satellites are possibly estimated inaccurately, wherein in the receiver the Doppler shift is possibly estimated incorrectly, wherein errors occur also in the definition of the transfer speed of the receiver whereby reliable function of a tracking loop is possibly prevented. Due to an inaccurate estimation of GPS time the receiver cannot utilize the prediction of the bit edge and coherent integration by means of which the effect of the navigation data modulated to the signal in locking and tracking could be eliminated. Furthermore, a coherent integration for a period of time longer than the duration of the modulating bit is not possible, if the receiver is not capable of defining the timing of the bit edge. Furthermore, when defining the code phase the receiver cannot use such a narrow search window which would be possible if the time estimation was correct.

It is an aim of the present invention to provide a method for reducing the effects of time data inaccuracies in determining the position of a receiver also when the signal strength is so weak that navigation information cannot be received. It is also an aim of the invention to provide a positioning receiver. The invention is based on the idea, that time data is defined at two different stages, wherein the time data used in positioning is defined at one stage and the time data of the satellites corresponding to the location of the satellite at the other. These two pieces of time data are defined irrespective of each other. The aim is to utilize the time data defined in both ways to find such a value of the time data in which the error estimated from the positioning data is substantially in the minimum. The method according to the present invention is primarily characterized in what will be presented in the characterizing part of the appended claim 1. The positioning system according to the present invention is primarily characterized in what will be presented in the characterizing part of the appended claim 7. Further, the electronic device according to the present invention is primarily characterized in what will be presented in the characterizing part of the appended claim 14.

Considerable advantages are achieved by the present invention when compared with methods and positioning receivers of prior art. When the method according to the invention is applied, it is possible to improve the accuracy of the positioning, because the error in the time data can be minimized. Furthermore, in a method according to a preferred embodiment of the invention it is possible to accelerate the positioning, because the error in the time data can be defined more accurately, and this information can be utilized in new positioning processes.

In the method according to a preferred embodiment of the invention the calculations required in the positioning are primarily conducted in a computing server which communicates with a data transmission network, wherein the calculation can be conducted considerably faster than in solutions of prior art.

Furthermore, the network-based implementation according to a preferred embodiment of the invention also has additional advantages when compared to a network-assisted receiver. When positioning calculation is instead of a receiver performed in a data transmission network, it is not necessary for the data transmission network to transmit to the receiver any auxiliary data used in the positioning, such as Ephemeris data. Thus, the reduced need for data transmission also reduces the loading in the data transmission network.

In some situations the first positioning (TTFF, time to first fix) may, for example after the positioning receiver is switched on, be faster in a network-based implementation than in a network-assisted implementation, because in the network-based implementation the positioning receiver must send only the measured chip and code phase measurements to the computing server. In the transfer of these measurements a considerably smaller number of bits is required than in the transmission of auxiliary data from the data transmission network to the positioning receiver. Especially if the data transmission network is loaded, the positioning in the network-assisted method may be delayed when the auxiliary data is delayed in the network. However, in a network-based implementation the positioning can be calculated substantially immediately after the receiver has received the chip and code phase measurements from the positioning receiver. This has considerable advantage especially in emergency situations, as the calculated position of the receiver is known substantially immediately, and it is not necessary to wait for the transfer of the same from the positioning receiver.

Considerable advantages are achieved by the present invention when compared with methods and positioning receivers of prior art. When the method according to the invention is applied, it is possible to perform positioning also in cases where the strength of the received signal is very weak, for example inside buildings. By means of the method according to the invention, it is possible to better detect the starting points and value of the bits in the received signal.

Figure 4:
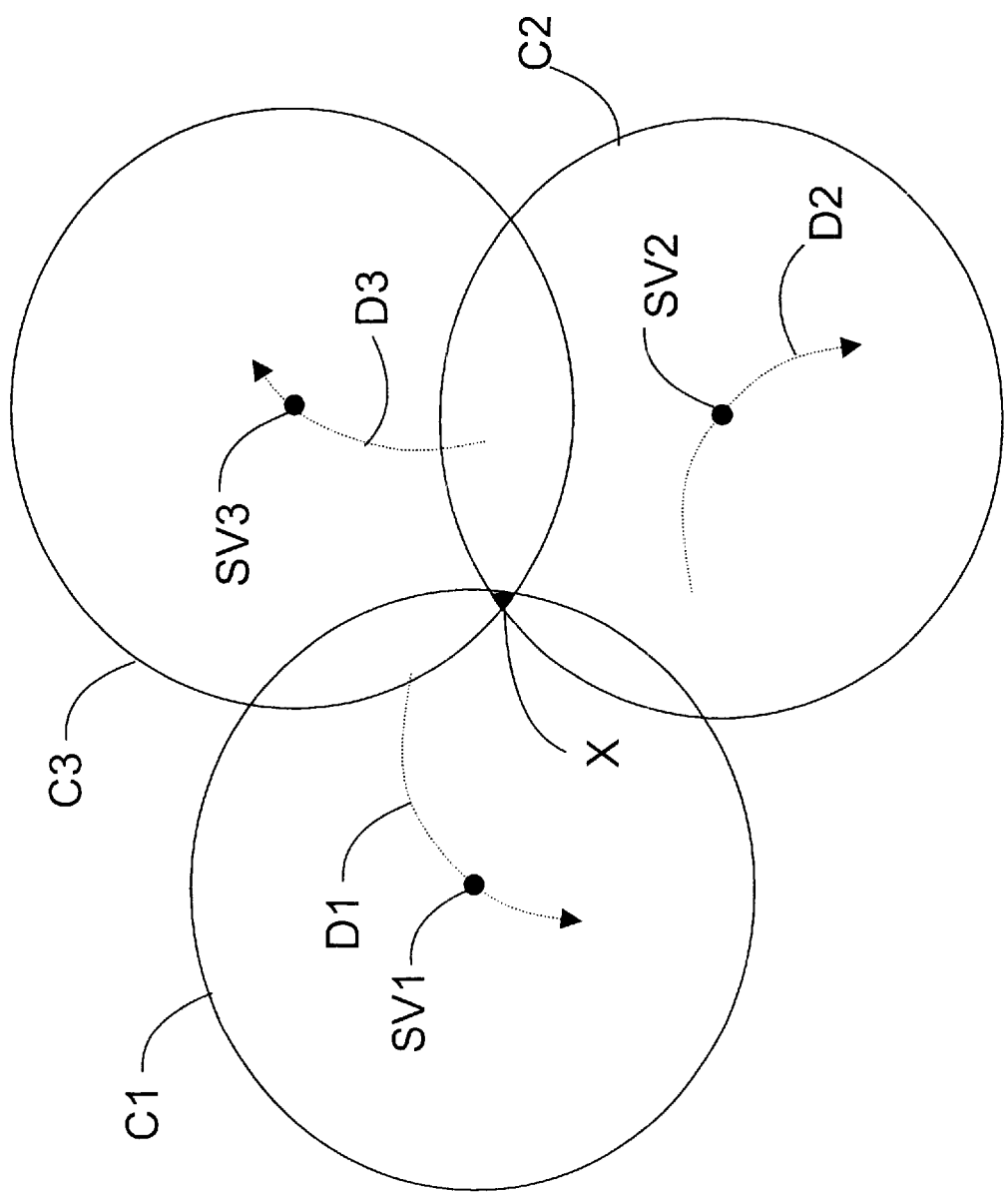
Figure 5:
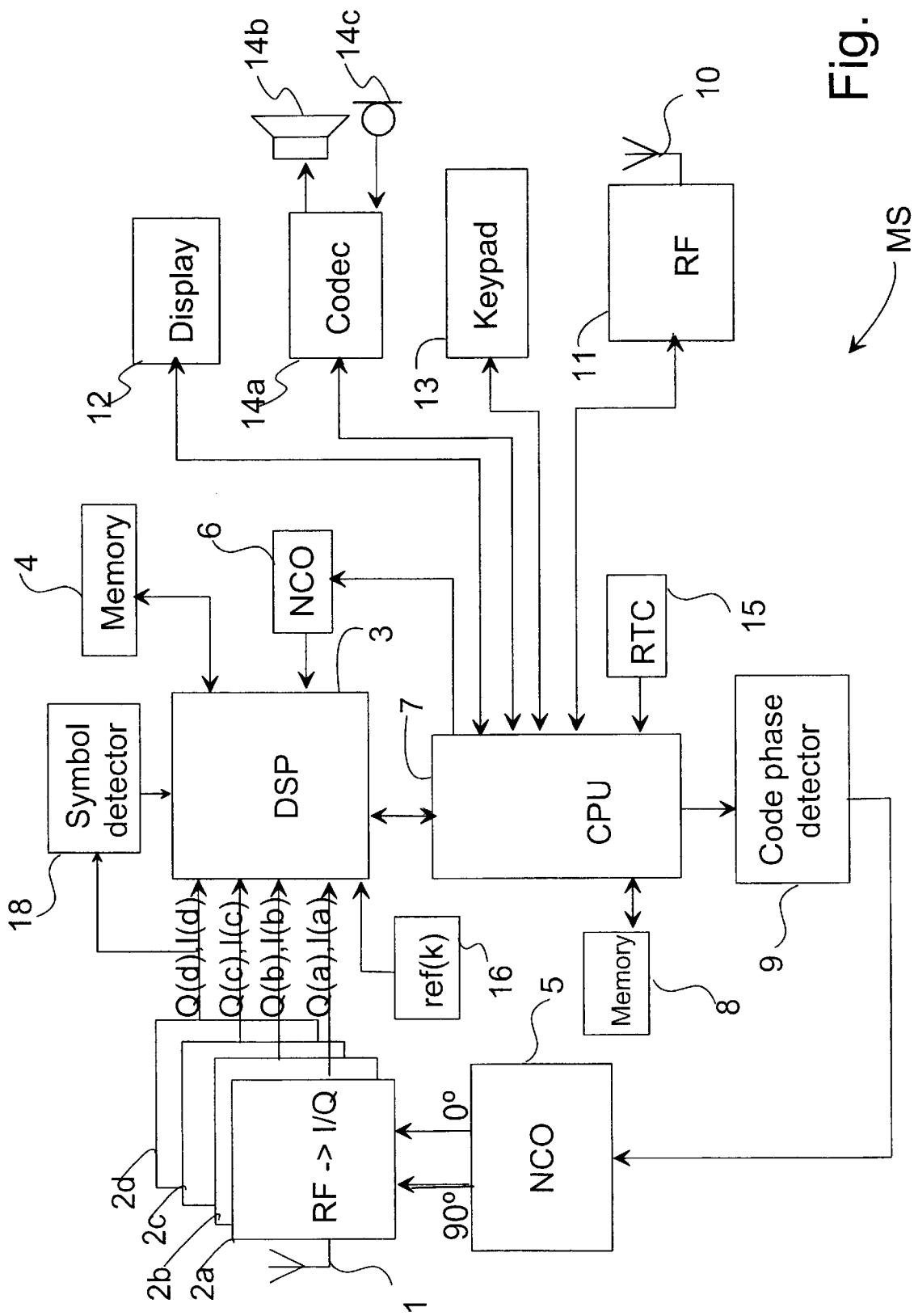

In the following, the invention will be described in more detail with reference to the appended drawings, in which FIG. 1 shows, in a reduced principle chart, positioning by means of a signal transmitted from four satellites in a communication network, FIG. 2 shows an example of a frame structure used in the GPS system, FIG. 3 illustrates a formula according to prior art with its different terms, which formula is used for estimating the time of transmission of a signal received at a time of positioning, FIGS. 4a and 4b illustrate in a plane figure the improvement of accuracy in positioning attained by means of a method according to a preferred embodiment of the invention, and FIG. 5 shows, in a reduced block chart, a receiver in which the method according to the invention can be applied.

To describe the operation of the method according to the invention, positioning and the measurements and calculations used therein in a positioning receiver MS according to FIG. 5 are first discussed in the following.

In a positioning receiver MS according to FIG. 5, a signal to be received via a first antenna 1 is converted preferably to an intermediate frequency or directly to a carrier frequency in converter blocks 2a–2d. The receiver MS of FIG. 5 comprises four receiving channels, each having a separate converter block 2a–2d, but it is obvious that the number of channels can also be different from that presented herein. The signal converted in the converter blocks 2a–2d to the intermediate frequency or carrier frequency comprises two components, known as such: I and Q components, with a phase difference of 90° therebetween. These analog signal components, converted to the intermediate frequency, are digitized. During the digitizing of the signal components, preferably at least one sample is taken of each chip, i.e. in the GPS system, at least 1,023,000 samples are thus taken in a second. Furthermore, the I and Q components of the digitized signal are multiplied by a signal formed with a first numerically controlled oscillator (NCO) 5. The purpose of the signal of this first numerically controlled oscillator 5 is to correct the frequency deviation caused by the Doppler shift and the frequency error of the local oscillator (not shown) of the receiver 1. The signals formed in the converter blocks 2a–2d and indicated with the references Q(a),I(a)–Q(d),I(d) in FIG. 5, are preferably led to a digital signal processor 3. In block 16, reference codes ref(k) are also generated, corresponding to the codes used in code modulation of the satellites to be received at a given time. Using e.g. this reference code ref(k), the receiver MS attempts to find the code phase and frequency deviation of the signal of the satellite to be received on each receiving channel, to be used in operations after the synchronization.

One advantageous positioning receiver MS comprises one converter block 2a in which the signal is converted preferably to a very low intermediate frequency (almost to a baseband frequency), for which an analog to digital conversion is conducted. Thereafter the digital signal divided into I- and Q-components is distributed to N receiving channels for further processing.

A control block 7 is used to control e.g. a code phase detector 9 which is used for adjusting the frequency of the numerically controlled oscillator 5, if necessary. The synchronization will not be described in more detail in this specification, but it is prior art known per se. After the receiving channel has been synchronized with the signal of a satellite SV1, SV2, SV3, SV4, it is possible to start demodulation and storage of the navigation information transmitted in the signal, if necessary. The digital signal processor 3 stores navigation information preferably in a memory 4. In the method according to the first preferred embodiment of the present invention, this navigation information does not need to be modulated and stored, but the positioning receiver MS must define the chip and code phase of the signals received from the satellites.

The positioning receiver MS also comprises means for performing the functions of the wireless device, such as a second antenna 10, a radio part 11, audio means, such as a codec 14a, a speaker 14b and a microphone 14c, a display 12, and a keypad 13.

In the following, the method according to a preferred embodiment of the invention will be described. In the description it is assumed that the calculations are performed in the positioning receiver MS, but it is obvious that the method can also be applied in such a manner that at least part of the computing is conducted in a separate computing server S or the like. In addition to the positioning, time data is also defined in two phases in the method. Thus, instead of a 4-dimensional (place-time: x,y,z,t) solution, the method comprises a 5-dimensional (place-time-time: x,y,z,t1,t2) solution. This can be implemented for example in such a manner that the 4-dimensional place-time solution is conducted first, and a first time estimation is attained therein. Thereafter the time estimation is specified by means of second stage time estimation. This second stage time definition can be conducted for example in such a manner that attempts are made to detect from the received signal the edge of a bit in the navigation data modulated to the signal for example by means of a symbol rate detector 18, or the like.

Said 4-dimensional time-place solution can be conducted for example in such a manner that the estimated location of the satellites at the time of transmission of the signals is defined from the received signals, whereafter it is possible to calculate the pseudo ranges from the receiver to these satellites. Here, the time data contained in the receiver is used, which time data can be erroneous to a significant degree. Furthermore, estimation is calculated to find out how significant the error is in the pseudo ranges defined according to said time data. Thereafter the time data is changed recursively, and the pseudo ranges and errors are recalculated. These stages are repeated until the smallest error is attained, and the time data corresponding to the same is used as a default value for the GPS time. Thereafter in the method the bit edges are searched for in the signal received in a channel. After the bit edge has been found, i.e. the symbol rate detector is locked to the received signal, it is possible to use the time of occurrence of these bit edges in the fine adjustment of the time data.

The chip and code phases $$T_{chip}^j(k)$$

are preferably defined substantially simultaneously for all receiving channels, wherein the time of reception of the signal received in each receiving channel is substantially the same.

If the navigation information available in the receiver MS is not sufficient, in the method according to a preferred embodiment of the invention the time of transmission of the received signals is defined on the basis of the time $$T_{chip}^{j}(k)$$

in seconds corresponding to the number and code phase of the chips received after the epoch change of the received signal as well as on the basis of the navigation information contained in the positioning receiver MS. This navigation information contains almanac information, wherein the positioning receiver MS can define the location of each satellite at a fixed moment. It is, however, problematic, that the positioning receiver MS is not necessarily synchronized accurately with the real GPS time.

In principle, the location can be calculated in various ways, but here only one method is described: the least mean squares (LMS) method. For the sake of simplicity, some basic functions are disregarded in the following, for example correction of the error in the clock of the satellite SV1, SV2, SV3, SV4, ionospheric corrections, etc. In addition, it is assumed that in the positioning receiver MS earlier positioning data is not available, and that all measurements are conducted simultaneously, i.e. in each receiving channel the sampling is conducted parallelly at the same moment. The received signals are stored in a memory, and thus they can be further processed at different times.

A reference clock 15 is formed for example by means of a real-time clock (RTC) of the positioning receiver MS, or it may also be formed by an external clock (not shown) or the time data may be obtained from an external network, such as a mobile communication network.

To define the time of transmission ToT, only the time $$T_{chip}^{j}(k)$$

in seconds corresponding to the number and code phase of the chips received after the epoch change can be defined in a situation in which the strength of the signal to be received is weak. By means of this parameter it is possible to measure only the differences on the chip level (<1 ms) in the signals of different satellites SV1, SV2, SV3, SV4, because the same code is repeated at intervals of one epoch (=1 ms). Because the distance between each satellite and receiver can differ significantly, there may be large differences, even differences over 10 ms, in the times of flight of signals received from different satellites. Thus, the definition of the differences on the chip level is not sufficient. One millisecond in time represents a distance of approximately 300 km when the signal propagates substantially at the speed of light. Correspondingly, one chip (approximately 1 $\mu s$=1 ms/1023) equals approximately 300 meters.

In such a situation the differences of milliseconds have to be defined in different receiving channels on the basis of the distances between the satellites SV1, SV2, SV3, SV4 and the receiver MS. Generally, the estimated location of the receiver MS is not necessarily known. The location of the receiver MS can be estimated at first. Thus, the estimated distance between the satellite and the receiver MS can be calculated in the following manner.

$$\hat{N}_{ms}^{j}(k) = \left\lceil \frac{\|\bar{x}_{SV}^{j}(k) - \hat{\bar{x}}_{u}\|}{c} \right\rceil \quad (2)$$

in which $\lceil . \rceil$ indicates rounding up to the nearest integer, and the line above the variable indicates that it is a vector. The receiver contains some kind of an estimation of the GPS time $\hat{T}_{GPS}$, for example the time of the reference clock 15, which, at this stage, can be several seconds, even minutes fast or slow.

After the distance $$\hat{N}_{ms}^{j}(k)$$

in time has been calculated for all receiving channels according to Formula 2, it is possible to estimate the times of transmission of the signals according to the following formula.

$$\hat{T}_{ToT}^{j}(k) = T_{GPS}^{j}(k) - \hat{N}_{ms}^{j}(k) + T_{chip}^{j}(k) \quad (3)$$

Any measured value of the time of transmission of the satellite signal can be selected as the reference time. The time of the satellite at the time of reception k, i.e. the GPS time, $\hat{T}_{GPS}(k)$, can thereafter be estimated by supplementing the time of transmission ToT attained on the basis of the measurement selected as reference time with the estimated transfer delay, i.e. the time of flight of the signal from the satellite to the receiver. Here, similarly to Formula 1, the estimated transfer delay is 78 ms.

$$\hat{T}_{GPS}(k) = \hat{T}_{ToT}^{j}(k) + 0.078 \quad (4)$$

After the GPS time has been preliminarily defined, it is possible to define the measured pseudo ranges by subtracting the calculated times of transmission of the signal from the estimated GPS time and multiplying the result with the speed of light in the following manner:

$$\rho_{m}^{k} = (\hat{T}_{GPS} - \hat{T}_{ToT}^{j}(k))c \quad (5)$$

in which c indicates the speed of light in a vacuum, the superscript j indicates from which satellite signal the measured value comes from (e.g. 1 to 4) and the subindex m indicates that the pseudo range is a measured pseudo range, not an estimated one.

The estimated pseudo ranges are calculated in relation to the location $$\hat{\bar{x}}_{u}$$

of the user's receiver and to the locations $$\bar{x}_{SV}^{j}(\hat{T}_{GPS})$$

of the satellites at an estimated time of transmission ToT. The locations of the satellites are calculated as a function of time by means of equations known as such. Here, for the sake of simplicity, the estimated pseudo ranges are expressed by means of the following formula:

$$\rho_p^k = f(\hat{T}_{GPS}, \bar{\hat{x}}_u) \qquad (6)$$

to indicate that the estimated pseudo ranges are based solely on the estimated GPS time and to the estimated location of the user. In Formula (6) the term f represents a (strongly) non-linear function, the subindex p indicates that this is an estimation, and $$\bar{\hat{x}}_u$$

is the estimated location of the user, in which the line above the variable indicates that it is a vector.

The location $$\bar{\hat{x}}_u$$

of the user and the difference between the estimated GPS time and the real GPS time can be calculated iteratively for example by the least mean squares method. This method is known as such. In the least mean squares method the following set of equations is solved:

$$\rho_m^k = \|\bar{x}_{SV}^j(k) - \bar{\hat{x}}_u\| + ct_u, \ j = 1 \ldots M \qquad (7)$$

The aim is to find such location data $$\bar{\hat{x}}_u$$

and time error $\Delta t_u$, which best suit to a number M of measurements. The solution of this set of equations is straightforward as such:

$$\begin{bmatrix} \Delta \bar{\hat{x}}_u \\ \Delta t_u \end{bmatrix} = (H^T H)^{-1} H^T \Delta \bar{p} \qquad (8)$$

in which $$\Delta \bar{p} = \bar{p}_m^j - \rho_p^j, \ j = 1 \ldots M \qquad (9)$$

$$\Delta \bar{\hat{x}}_u$$

is the correction vector of the location, $\Delta t_u$ is the correction of the time error and H=the linearized Jacob's matrix of the pseudo ranges estimated in point $$\bar{\hat{x}}_u.$$

The solution given by the least mean squares method is optimal with respect to the sum of squared errors (SSE). This sum of squared errors can be estimated by means of a formula:

$$SSE \cong \left(\Delta \bar{p} - H \begin{bmatrix} \Delta \bar{\hat{x}}_u \\ \Delta t_u \end{bmatrix}\right)^T \left(\Delta \bar{p} - H \begin{bmatrix} \Delta \bar{\hat{x}}_u \\ \Delta t_u \end{bmatrix}\right) \qquad (10)$$

By rearranging the terms and using slightly different expressions for the terms, it is possible to write the formula (7) in the following manner:

$$\rho_m^j(T_{GPS}) = \|\bar{x}_{SV}^j(\hat{T}_{GPS}) - \bar{\hat{x}}_u\| + ct, \ j = 1 \ldots M \qquad (11)$$

The parentheses indicate that the term in question is based on the parameter presented in the parentheses. When such a presentation mode is used, it can be clearly seen that the measured pseudo ranges are functions of the real GPS time and the rest of them are functions of the estimated GPS time. If the time data of the reference clock is substantially the same as the real GPS time, the time error of the receiver can be represented as a time difference according to the following formula:

$$\Delta t_u \cong \Delta T = T_{GPS} \hat{T}_{GPS} \qquad (12)$$

The effect of an inaccurate reference clock 15 in the positioning can be detected in the above-presented formulas 11 and 12. If the time data of the reference clock 15 deviates significantly from the real GPS time, the first term in the Formula 11 is not based on the real GPS time. The time error of the receiver cannot in this situation be presented as a time difference according to the formula 12, either. Thus the clock error $\Delta t_u$ is not necessarily the same as the difference between the real GPS time and the estimated GPS time, but it describes the time differences to be detected on the chip level. These time differences, which can be detected on the chip level, are, however, differences under 1 ms, and thus it is not possible to define the differences of even hundreds of seconds caused by the inaccuracy of the reference clock 15 merely by means of these measurements on the chip level.

The inaccuracy of the reference clock also results in that the locations of the satellites SV1 to SV4 calculated on the basis of the above-presented formulas do not necessarily correspond to the actual location of the same, which at the same time means that the positioning of the receiver MS can be significantly inaccurate. Therefore, the clock error has to be defined as accurately as possible.

In Formula 12 $\Delta T$ represents this real clock error between the estimated time $\hat{T}_{GPS}$ and the true GPS time $T_{GPS}$. Thus, this true clock error $\Delta T$ has to be defined. In the method according to the invention optimization is used. To implement this, an error value is defined for the positioning, which shows how well positioning corresponds to the actual location. The purpose of optimization is to minimize this error value by sliding the satellites in a way on the basis of Ephemeris data of the same, and by searching such time data that the location of the satellites corresponding thereto makes it possible to attain the smallest error. In the following description of a preferred embodiment of the invention the sum of squared errors SSE produced by means of the Formula 10 is selected as an example of the error value.

After the location is calculated in the computing server S at least once by a value of the clock error $\Delta T$, this error value SSE is also calculated and stored in the memory. Thereafter the location data of the satellites is changed to a certain degree. This can be conducted in such a manner that the estimated GPS time is changed (the clock error $\Delta T$ is changed), whereafter on the basis of this changed GPS time and the Ephemeris data of the satellites the locations of the satellites and a new (4-dimensional) place-time solution (Formulas 7, 8, 9) of the receiver are calculated. Thereafter the error value SSE can be recalculated for the new error value ΔT of the reference clock by means of the formula 10 by using this new place-time solution. The stored error value SSE is compared to the value that has now been calculated. If the error value SSE was increased, the location information of the satellites is changed to another direction and the error value SSE is recalculated and a comparison is conducted between the stored and calculated error value. If the error value SSE was reduced, the new error value SSE is stored in the memory. Furthermore, the location data of the satellites is changed to the same direction, the error value SSE is calculated and a comparison is conducted between the stored and calculated error value. The above-presented stages are repeated until the substantially smallest value of the error value SSE is found. To search for this smallest value it is possible to reduce the change in the estimated GPS time, wherein the desired accuracy can be attained iteratively in the search for the minimum. There are also various other possibilities to optimize the above-presented error value SSE, and they are of prior art known by anyone skilled in the art, and therefore a more detailed discussion thereof is not necessary in this context.

After the minimum is found with a desired accuracy, the time error ΔT is known. The definition accuracy of this time error ΔT can be affected by the constellation of the satellites used in defining the time error, and the noise mixed in the signal. Thus, there may still be an error of few milliseconds in the time error.

In the positioning receiver MS an attempt is made to further specify the local time data on the basis of the bit edges advantageously in the following manner. The purpose of a symbol rate detector 18 known as such is to gain synchronization with the signal of at least one receiving channel to indicate the bit edges. By means of such a symbol rate detector 18 it is in several situations possible to define the point in which the bits are changed, even though it would not be possible to define the bit values themselves and the bit in question at a given time, for example because of a poor signal-to-noise ratio. After the above-presented more rough time data has been defined, the positioning receiver MS is, however, aware of the value of the variable $T_{TOW}^j$. The symbol rate detector may comprise for example a phase-locked loop (not shown), or the like. After the locking, it is possible to obtain a reference time to a bit edge from the symbol rate detector 18. In the modulation of the signal each bit comprises 20 epochs, i.e. the bit length is 20 ms. When the length of the bit is known, it is also known at which discrete moments of time the bit can change. Furthermore, in the positioning receiver MS it is known which is the number and code phase of the whole chips received after the last epoch change of the received signal. Now, the time estimation can be specified on the basis of this bit edge, because it is assumed that the error of the time data is less than 20 ms (=the length of one bit).

Thereafter the reference clock 15 of the positioning receiver MS can be set to a time corresponding to the calculated GPS time and a new calculation of the location can be conducted by using the specified time data.

To specify the estimation of time, it is sufficient that the bit edge can be indicated in one receiving channel. Thus, if a signal of sufficiently good quality is not obtained in other receiving channels to indicate the bit edge, it is possible to determine the GPS time by means of one channel, and this data can be used thereafter to predict the bit edges of other receiving channels.

One alternative for finding the minimum is filtering, in which the time error ΔT is solved again at each time of positioning, and numerical filtering is conducted for the time error for example in such a manner that an average value is defined for the time errors obtained at different times. Thus, the time error starts to approach the correct value. In this way it is possible to reduce the effect of noise that has possibly occurred in the measurements.

Furthermore, FIGS. 4a and 4b show a two-dimensional description of the principle of this method according to a preferred embodiment of the invention. The drawing shows three satellites SV1, SV2, SV3. Broken-line arrows D1, D2, D3 illustrate the travel paths of these satellites. Each circle C1, C2, C3 describes the area in which the positioning receiver MS is located according to the calculations of the satellite in question. Thus, the location of the positioning receiver MS is in the sectional area of the circles defined on the basis of these three satellites and marked with the reference X. In the situation of FIG. 4a, the time error is still quite significant, but in the situation of FIG. 4b, the time error is specified by means of the method according to the invention, wherein the inaccuracy of the location is already quite small.

After the receiving channel of the positioning receiver MS has been synchronized with the signal of a satellite SV1, SV2, SV3, SV4, it is possible to start demodulation and storage of the navigation data transmitted in the signal, if possible. The digital signal processing unit 3 stores navigation information preferably in the memory 4.

The invention can also be applied in such a system in which for example a mobile communication system is utilized in addition to the positioning by means of satellites. Thus, by means of three or more base stations BS, BS', BS" of the mobile communication system, whose location is known, it is possible to define the location of the receiver MS with an accuracy, typically with an accuracy which is somewhat poorer than the GPS positioning by using the functions of the mobile communication system for measuring the propagation time to define the time of flight of the signal from the base station to the receiver. By means of these propagation time measurements it is possible to define the distance of the receiver MS from the different base stations in time, wherein the location of the receiver MS can be defined.

Another alternative is that the angles-of-arrival (AOA) α, α', α" of the signal from the mobile station MS to two or more base stations BS, BS', BS" are defined and this defined information on the angles of arrival is transmitted to the device that conducts the calculation, for example to the computing server S or to the receiver MS. Thus, it is possible to define the direction of the receiver MS with respect to at least two base station BS, BS', BS" on the basis of the angles of arrival of the signal.

Another alternative is that both the time of flight and the angle of arrival α, α', α" (FIG. 1) of the signal from the mobile station to at least one base station BS, BS', BS" are defined and this defined information on the propagation time an angles of arrival of the signal is transmitted to the device that conducts the calculation, for example to the receiver MS. Thus, it is possible to define the direction and distance d, d', d" of the receiver MS with respect to at least one base station BS, BS', BS" on the basis of the propagation time and angle of arrival of the signal.

This arrangement can be utilized for example in cases where the receiver MS is unable to receive the signal transmitted by the satellites, or the strength of the signal is so weak that chip level measurements cannot be carried out.

Thus, in a situation where it is possible to use satellite positioning again, for example the location of the receiver MS defined on the basis of said base stations can be selected as default location.

In the method according to a preferred embodiment of the invention the above-mentioned calculations can be carried out advantageously in a digital signal processing unit 3 and/or in a control block 7. For this purpose, the application software is provided with the necessary program commands in a manner known as such. The results of the calculations as well as the possibly necessary intermediate results are stored in a memory 4, 8. After the positioning the defined location of the positioning receiver can be advantageously presented on a display 12 for example by means of co-ordinates. On the display 12 it is also possible to present map information of the area in which the positioning receiver MS of the user is located at the time. This map information can be loaded for example via the mobile communication network advantageously in such a manner that the defined location information are transmitted from the mobile station functions of the positioning receiver MS to the base station BS, which transmits them to further processing, e.g. to a mobile services switching centre (not shown). When necessary, a connection is set up from the mobile communication network e.g. via the Internet network to such a server (not shown) in which the map information of the area in question is stored. Thereafter the map information is transmitted via the mobile communication network to the base station BS and further to the positioning receiver MS.

Although the invention has been described above primarily in connection with a positioning receiver MS, it is obvious that the invention can also be applied in other kinds of electronic devices equipped with means for positioning the electronic device. Thus, these means for positioning an electronic device comprise a positioning receiver MS according to a preferred embodiment of the invention.

The invention can also be applied in connection with wireless communication networks other than mobile communication networks. Thus, the location of a known point in the vicinity of the positioning receiver can be received via the wireless communication network.

It is obvious that the present invention is not limited solely to the above-presented embodiments, but it can be modified within the scope of the appended claims.

What is claimed is:

1. A method for determining an error of reference time of a receiver in positioning means, in which method a code-modulated signal transmitted by satellites is received, which signal is produced by means of a code individual for each satellite and the code-modulated signal is modulated at least with binary modulation information, in which method the time of transmission $$(\hat{T}_{ToT}^{k})$$

of the signal received from the satellite used in the positioning is determined and used in the positioning of the satellite, wherein in order to determine the error of the reference time positioning is conducted and on the basis of the defined location an error value is calculated, that in the method the minimum of the error value is searched by defining the location of the receiver by means of at least two different locations of the satellites corresponding to the time of transmission of the signal and by calculating an error value for said at least two defined locations of the receiver, wherein the error of the reference time is defined on the basis of the minimum of the searched error value, that in the receiver the moment of bit change in the modulation information is also determined and said moment of bit change is used to specify the error of the reference time.

2. A method according to claim 1, wherein the code used in the modulation is formed of a set of chips, wherein the signal modulated with said set of chips forms an epoch which is repeated in the code-modulation, that a reference code corresponding to the individual code of each satellite is used in the receiver to determine the epoch change and the code phase $$(T_{chip}^{j}(k)),$$

wherein the number and code phase $$(T_{chip}^{j}(k))$$

of the chips receives after the epoch change preceding the time of positioning are determined in the receiver.

3. A method according to claim 1, wherein the moment of change of the bit is defined by means of a symbol rate detector.

4. A method according to claim 1, in which information is transmitted in subframes, and at least in one subframe information on the time is transmitted, wherein in that on the basis of the moment of bit change the time passed from the beginning of the first received subframe is calculated, and the error of the reference time is specified on the basis of said calculated time.

5. A method according to claim 1, wherein the signal transmitted by at least four satellites is used in the positioning.

6. A method according to claim 1, wherein the satellites are satellites of the GPS system.

7. A positioning system which comprises a receiver comprising at least means for forming a reference time, and means for receiving the code-modulated signal transmitted by satellites, which code-modulated signal is produced by means of a code individual for each satellite and the code-modulated signal is modulated at least with binary modulation information, and which positioning system comprises means for defining the time of transmission $$(\hat{T}_{ToT}^{k})$$

of the signal received from the satellite used in the positioning and means for defining the location of the satellite, wherein the positioning system also comprises positioning means for defining the location $$(\bar{x}_u)$$

of the receiver, means for calculating an error value on the basis of the defined location $$(\bar{x}_u),$$

means for searching the minimum of the error value by defining the location $(\bar{\hat{x}}_u)$ of the receiver by means of at least two locations $(\bar{\hat{x}}_{SV}^k)$ of the satellites corresponding to the time of transmission of the signal and by calculating an error value for said at least two defined locations $(\bar{\hat{x}}_u)$ of the receiver, wherein the error of the reference time is arranged to be defined on the basis of the searched minimum of the error value, and that the receiver also comprises means for defining the moment of bit change in the modulation information and means for using said moment of bit change to specify the error of the reference time.

8. A positioning system according to claim 7, wherein the code used in the modulation is formed of a set of chips, wherein the epoch is formed of the signal modulated with said set of chips, which signal is repeated in the code-modulation, that the receiver comprises means for forming a reference code, means for defining the epoch change and the number and code phase $(T_{chip}^j(k))$ of chips received after the epoch change preceding the time of positioning on the basis of said reference code.

9. A positioning system according claim 7, wherein the means for defining the moment of bit change in the modulation information comprise a symbol rate detector.

10. A positioning system according to claim 7, in which information is arranged to be transmitted in subframes, and at least in one subframe information on the time is arranged to be transmitted, wherein the positioning system comprises means for calculating the time passed from the beginning of the first received subframe on the basis of the moment of bit change and means for specifying the error of the reference time on the basis of said calculated time.

11. A positioning system according to claim 7, wherein the signal transmitted by at least four satellites is used in the positioning.

12. A positioning system according to claim 7, wherein the received signals are signals transmitted by the satellites of the GPS system.

13. A positioning system according to claim 7, wherein the receiver comprises means for performing the functions of a mobile station.

14. An electronic device which comprises at least means for forming a reference time, and a receiver comprising means for receiving a code-modulated signal transmitted by satellites, which code-modulated signal is produced by means of a code individual for each satellite and the code-modulated signal is modulated at least with binary modulation information, means for defining the time of transmission $(\hat{T}_{ToT}^k)$ of the signal received from the satellite used in the positioning and means for defining the location of the satellite, wherein the electronic device also comprises positioning means for defining the location $(\bar{\hat{x}}_u)$ of the receiver, means for calculating an error value on the basis of the defined location $(\bar{\hat{x}}_u),$ means for searching the minimum of the error value by defining the location $(\bar{\hat{x}}_u)$ of the receiver by means of at least two different locations $(\bar{\hat{x}}_{SV}^k)$ of the satellites corresponding to the time of transmission of the signal and by calculating an error value for said at least two defined locations $(\bar{\hat{x}}_u)$ of the receiver, wherein the error of the reference time is arranged to be defined on the basis of the minimum of the searched error value, and that the receiver also comprises means for defining the moment of bit change in the modulation information and means for using said moment of bit change to specify the error of the reference time.

* * * * *

UNITED STATES PATENT AND TRADEMARK OFFICE
CERTIFICATE OF CORRECTION

PATENT NO. : 6,618,006 B1
DATED : September 9, 2003
INVENTOR(S) : Syrjarinne, J.

It is certified that error appears in the above-identified patent and that said Letters Patent is hereby corrected as shown below:

<u>Column 17,</u>
Line 35, should read -- A positioning system according to claim 7, wherein the means for defining the moment of bit change in the modulataion information comprise a symbol rate detector. --

Signed and Sealed this

Tenth Day of February, 2004

JON W. DUDAS
*Acting Director of the United States Patent and Trademark Office*